3,310,412
HIGH-MELTING GLASS FIBERS AND METHOD
Carl Ernst Hofstadt, Munich, Obermenzing, Paul F. Ludwig, Dreieichenhain, and Rudolf Fahn, Moosburg, Germany, assignors to A.G. Sudschemie, Munich, Germany, a corporation of Germany
No Drawing. Filed Nov. 12, 1964, Ser. No. 411,677
Claims priority, application Germany, June 12, 1964,
S 91,506
12 Claims. (Cl. 106—50)

It is known to draw glasses of many different kinds into fibers, thereby obtaining fibers which are stable up to about 600° C. In some cases, fused quartz has also been drawn into fine filaments, but this requires extremely high temperatures for the melting and drawing operations, and calls for a very pure and expensive raw material.

It has now been found that surprisingly high-melting fibers, which can easily be drawn to fine and superfine filaments, can be obtained from a glass composition containing 55 to 73% silica, 14 to 26% aluminum oxide, and, in addition, iron oxide, calcium oxide and magnesium oxide, and possibly small amounts of alkali. Particularly advantageous is the fact that, to obtain these glass compositions, one may start with a basic composition of raw materials containing alumina, in which the clay mineral components are mainly three-layer or three-layer mixed type minerals, especially those of the montmorine group, as for example montmorillonite. Such minerals are, for example, defined in "Clay Mineralogy" by R. E. Grim, 1953, on page 27. The iron oxide content is preferably between about 4 and 12% ferric oxide, and is best more than 5% ferric oxide. The ferric oxide can be partially replaced by corresponding amounts of other iron oxides, such as FeO and $Fe_3O_4$. The content of calcium oxide, magnesium oxide or mixtures thereof is desirably not more than 16%, better not more than 12%, and preferably not more than 7%. The calcium oxide can be in the range of about 1–10%, preferably about 1–8%; the magnesium oxide can be in the range of about 1–10%, preferably about 1–8%. If any alkali at all is contained in the composition, it is to amount to only 3 wt. percent or less, and preferably to no more than 2 wt. percent.

These compositions have a high melting point and can be drawn to superfine filaments resistant to high temperature, water, acids and alkalies.

These filaments furthermore exhibit outstanding acoustical, thermal and electrical insulating properties and high elasticity. Montmorillonite clays having a high iron content of 5% or more ferric oxide in the calcination residue have proven particularly favorable for the manufacture of the new filaments.

Although the above-named clays containing three-layer or three-layer mixed type clay minerals are mentioned as preferred starting components, because they already have approximately the required chemical composition, the glass composition can, of course, also be prepared synthetically from the appropriate pure or technical oxides, or the composition of the basic clays used can be modified as desired by the addition of appropriate substances, such as alumina or dolomite.

The raw, clay mineral-containing materials to be used according to the invention are first dehydrated at about 800° C., melted at approximately 1400 to 1500° C., and then, by any desired method, especially the conventional rod drawing or spinneret drawing method, they are drawn into filaments which can then be worked in the conventional manner—into rovings, for example.

The new fibers and the fabrics and other materials made therefrom can be used with advantage wherever glass fibers or glass fiber products have been used hitherto, especially for insulating purposes in electrical, acoustical and insulating engineering, as reinforcing materials for plastics, or for the manufacture of fabrics and the like. The fibers can be used as insulation for conductors in a manner conventional for known glass fibers, and likewise can be used in plastics as fillers and/or reinforcing material, in a manner known for other glass fibers. The fibers can be used in filters as the filtering material in a manner known for other glass fibers, and can be included in or made into fabrics as is known for other glass fibers.

They differ from the prior-art glass silks in their improved resistance to water as well as to acids and alkalies. Their dilatometric deformation point, which is approximately 150 to 200° C. higher, is also of great technical importance. Nevertheless, the elasticity of the fibers is not inferior to that of the glass silks, but is even superior.

It is indeed in the prior art to manufacture inorganic fibrous wools from high-melting materials, but, aside from quartz filaments, naught but short wool particles have been produced, not continuous filaments, which in many cases offer considerable advantages over the wool filaments (i.e., short-filament wools).

As regards the chemical composition of the new fibers, the following analysis of an example is given:

| | Percent |
|---|---|
| $SiO_2$ | 64.8 |
| $Al_2O_3$ | 18.8 |
| $Fe_2O_3$ | 6.9 |
| CaO | 3.1 |
| MgO | 4.2 |
| $Na_2O$ | 0.2 |
| $K_2O$ | 2.1 |

The following are the analyses of additional suitable glass compositions:

| | 1 | 2 | 3 |
|---|---|---|---|
| | Percent | Percent | Percent |
| $SiO_2$ | 72.8 | 61.5 | 55.0 |
| $Al_2O_3$ | 14.4 | 23.9 | 19.1 |
| $Fe_2O_3$ | 5.4 | 5.2 | 6.8 |
| CaO | 1.2 | 2.6 | 8.3 |
| MgO | 2.5 | 4.1 | 8.1 |
| $Na_2O$ | 0.3 | 0.3 | 0.4 |
| $K_2O$ | 2.7 | 1.2 | 2.1 |

Glass filaments of the claimed composition have coefficients of elongation between 20 and 500° C. of 27.85 x $10^{-7}$(cm.cm.$^{-1}$) as well as a dilatometric deformation temperature of 813° C. The dilatometric deformation temperature was determined with a Bollenrath dilatometer, and represents the temperature where log $\eta = 11$. The average tensile strength of the filaments runs around 12,000 and 20,000 kg./cm.$^{-2}$. The tensile strength was determined at room temperature with a series of single filaments 10 mm. in length at an elongation rate of 0.2 mm./min. Both the elongation and force were plotted by means of a recorder. From the thickness of each single filament the tensile strength was then calculated for a cross section of one square centimeter.

A special characteristic of the new glass fibers made from raw materials containing clay mineral is their low alkali content. This is why the sensitivity of the new fibers to water is extremely slight. It amounts to a solubility equivalent to about 0.04 cc. n/100 HCl required for neutralizing the alkali dissolved from 1 gram of glass composition. The test used for determining the solubility was the standard DIN 12,111 test (May, 1956). The granulated glass composition (2 grams) having a particle size of from 0.5 to 0.3 mm. which was first rinsed with cold distilled water to remove the glass dust was heated with 50 ml. of water at 98±2° C. for 60 minutes. The alkaline solution was then titrated with n/100 HCl to neutrality, and the blank value obtained in the same manner, but omitting the glass particles was subtracted from the acid equivalent. Industrially produced glass silks tested in the same manner have shown seven times that solubility.

Although as stated above, the present invention extends especially to continuous, drawn filaments, it is pointed out that the same favorable electrical, thermal and mechanical properties are also achieved when the fibers are made by other methods, e.g., by a blowing process.

Temperatures herein are in degrees centigrade. Percentages are on a melt basis, by which is meant on the basis of the ingredients of the melt as dry, dehydrated oxides used to form the melt.

What is claimed is:

1. Glass fibers resistant to high temperature, acid and alkali comprising melt basis about 55–73% $SiO_2$, 14–26% $Al_2O_3$, 4–12% $Fe_2O_3$, up to about 16% of a material selected from the group consisting of calcium oxide, magnesium oxide, and mixtures thereof, and alkali metal oxide in amount of less than about 3%.

2. An electrical conductor outfitted with insulation formed of glass fibers of a composition according to claim 1.

3. Plastic compositions including glass fibers according to claim 1.

4. Filter element comprising glass fibers according to claim 1.

5. Fabric comprising glass fibers according to claim 1.

6. Glass fibers according to claim 1, and having a coefficient of elongation between 20 and 500° C. of 27.85 x $10^{-7}$ (cm.cm.$^{-1}$), and a dilatometric deformation temperature of at least 813° C., and an average strength of about 12,000–20,000 kg/cm.$^2$.

7. Glass fibers according to claim 1, and having a solubility equivalent to about 0.04 cc. $n/100$ HCl required for neutralizing the alkali dissolved from 1 gram of the glass.

8. Glass fibers according to claim 6, and having a solubility equivalent to about 0.04 cc. $n/100$ HCl required for neutralizing the alkali dissolved from 1 gram of the glass.

9. Method of producing glass fibers which comprises forming a melt consisting predominantly of clay minerals selected from the group consisting of the three-layer and three-layer-mixed type minerals, said melt having a composition of 55–73% $SiO_2$, 14–26% $Al_2O_3$, 4–12% $Fe_2O_3$, up to about 16% of a material selected from the group consisting of calcium oxide, magnesium oxide, and mixtures thereof, and alkali metal oxide in amount of less than about 3%, and drawing melt into the fibers.

10. Method according to claim 9, the three-layer type mineral being montmorillonite.

11. Method for producing glass fibers which comprises forming a melt which comprises on a melt basis about 55–73% $SiO_2$, 14–26% $Al_2O_3$, 4–12% $Fe_2O_3$, up to about 16% of a material selected from the group consisting of calcium oxide, magnesium oxide, and mixtures thereof, and alkali metal oxide in amount of less than about 3%, by steps including melting a clay material having a melting point of about 1400–1500° C., said clay material constituting a major proportion of the melt.

12. Method for production of glass fibers which comprises forming a melt from material including clay minerals selected from the group consisting predominantly of three-layer and three-layer-mixed type materials, and a material selected from the group consisting of silica and dolomite, the composition of the melt including about 55–73% $SiO_2$, 14–26% $Al_2O_3$, 4–12% $Fe_2O_3$, up to about 16% of a material selected from the group consisting of calcium oxide, magnesium oxide, and mixtures thereof, and alkali metal oxide in amount of less than about 3%.

References Cited by the Examiner

UNITED STATES PATENTS 3,007,806    11/1961    Hartwig _____ 106—50

FOREIGN PATENTS 767,344    5/1952    Germany.
765,244    1/1957    Great Britain.

HELEN M. McCARTHY, *Acting Primary Examiner.*

TOBIAS E. LEVOW, *Examiner.*